Oct. 19, 1937.    C. L. DIXON ET AL    2,096,425
PRISM ASSEMBLY
Filed Aug. 12, 1935    2 Sheets-Sheet 1

Inventors:
Cletus L. Dixon,
Kenneth W. Kennedy,
Joseph P. Stando.
By: Hill and Hill
Attys.

Oct. 19, 1937.  C. L. DIXON ET AL  2,096,425
PRISM ASSEMBLY
Filed Aug. 12, 1935   2 Sheets-Sheet 2

Inventors:
Cletus L. Dixon,
Kenneth W. Kennedy,
By: Joseph P. Stando.
Hill and Hill
Attys.

Witness:
V. S. Gander

Patented Oct. 19, 1937

2,096,425

UNITED STATES PATENT OFFICE 2,096,425

PRISM ASSEMBLY

Cletus L. Dixon, Kenneth W. Kennedy, and Joseph P. Stando, Chicago, Ill., assignors to Colortone Corporation, Chicago, Ill., a corporation of Illinois Application August 12, 1935, Serial No. 35,743

7 Claims. (Cl. 88—1)

The invention relates to prisms and prism assemblies and more particularly it relates to reflecting prisms used in color photography for dividing the light coming from a photographed object into three parts of different colors so as to form three adjacent images of the same size, for impression upon a negative film or photographic plate from which positives are printed for projection in superimposed relation upon a screen. The prisms are also adapted for use in engraving and numerous other industrial and photograph arts. By the term "prism assembly", as used in the specification and claims, is meant a combination of prisms either cemented together or placed together in correct juxtaposition so that image forming rays will produce the optical results described.

In order that the pictures so projected will be clear in all their details and show the photographed objects in their true colors, it is desirable that each of the respective images be of correct distribution of intensity and that the quantity of light transmitted through the prism assembly and filters to the images be such as to produce the correct exposure and correct photochemical effect or density on the photographic film or plate on each of the images. It is also desirable that the images be equally spaced and lie in the same plane in order that they may be impressed upon a film or plate extending transversely to the paths of the light beams.

The separation into three parts of the light passing through a lens system, each part producing an image of the photographed object, is accomplished by placing on the image side of the lens an assembly of glass prisms providing partial reflectors and totally reflecting surfaces.

It is an object of the invention to provide a light dividing prism having partially transmitting reflectors whereby the light is divided into three sets of rays, each set having a preponderance of a given range of color.

It has hitherto been the practice to incline the partial or light dividing reflectors and the totally reflecting surfaces at an angle of 45° to the longitudinal axis of the prism assembly, which axis is parallel to the axis of the lens. Reflecting surfaces so inclined at an angle of 45° do not act as total reflectors for such rays as are incident upon them at angles smaller than the critical angle of refraction. Instead, some of the light is refracted through the surface, since with a lens of sufficiently large aperture and sufficiently short focus there will be some rays incident upon the inclined surfaces at angles smaller than the critical angle of refraction, provided the inclination is 45°. Consequently, with angles of inclination of 45°, there is a lessening of the light in portions of the side images, producing a lack of uniformity in color value and intensity in the recombined image produced by superposition of the three images upon a screen, or by any similar method of recombination.

It is another object of the invention to incline the partial reflectors and reflecting surfaces so that the latter are total reflectors for all rays which are permitted to pass through the instrument so as to form the required images, thus eliminating the non-uniform loss of light which otherwise would occur by refraction through these reflecting surfaces.

It is another object of the invention to provide prism assemblies having the novel construction described adapting them to separate the rays from a lens system into three components and wherein the inclination of each component, while travelling through the air and through the prism assembly, and the distances respectively travelled through air and glass, are so adjusted as to produce an image in the same plane as that of the others.

A further object of the invention is the provision of a pair of partial reflectors adapted to separate the rays into three components, the relative quantities of which are such that, following their respective passage through filters of different colors and degrees of transmissibility, they produce for a neutral gray object even exposure and equal photo-chemical effect or density on the film or photographic plate.

False images and other irregularities of the true images frequently result from light undergoing unwanted internal reflection, or are due to light from object points other than those which are imaged in the three frames. It has been found that the detrimental results of such false images and irregularities may all be eliminated by intercepting the light producing the same and it is a still further object of the invention to provide a novel system of masks positioned, some at the inlet end of the prism system, and others at intermediate points within the prism, the masks being so arranged as to effectively intercept the troublesome light and not to interfere with the rays which produce the true images, whereby all false images and other objectionable features otherwise existing during exposure are eliminated.

Many other objects and advantages of the construction herein shown and described will be obvious to those skilled in the art from the disclosure herein given.

To this end my invention consists in the novel construction, arrangement and combination of parts herein described and more particularly pointed out in the claims.

In the drawings, wherein like reference characters indicate like or corresponding parts:

Figure 1:
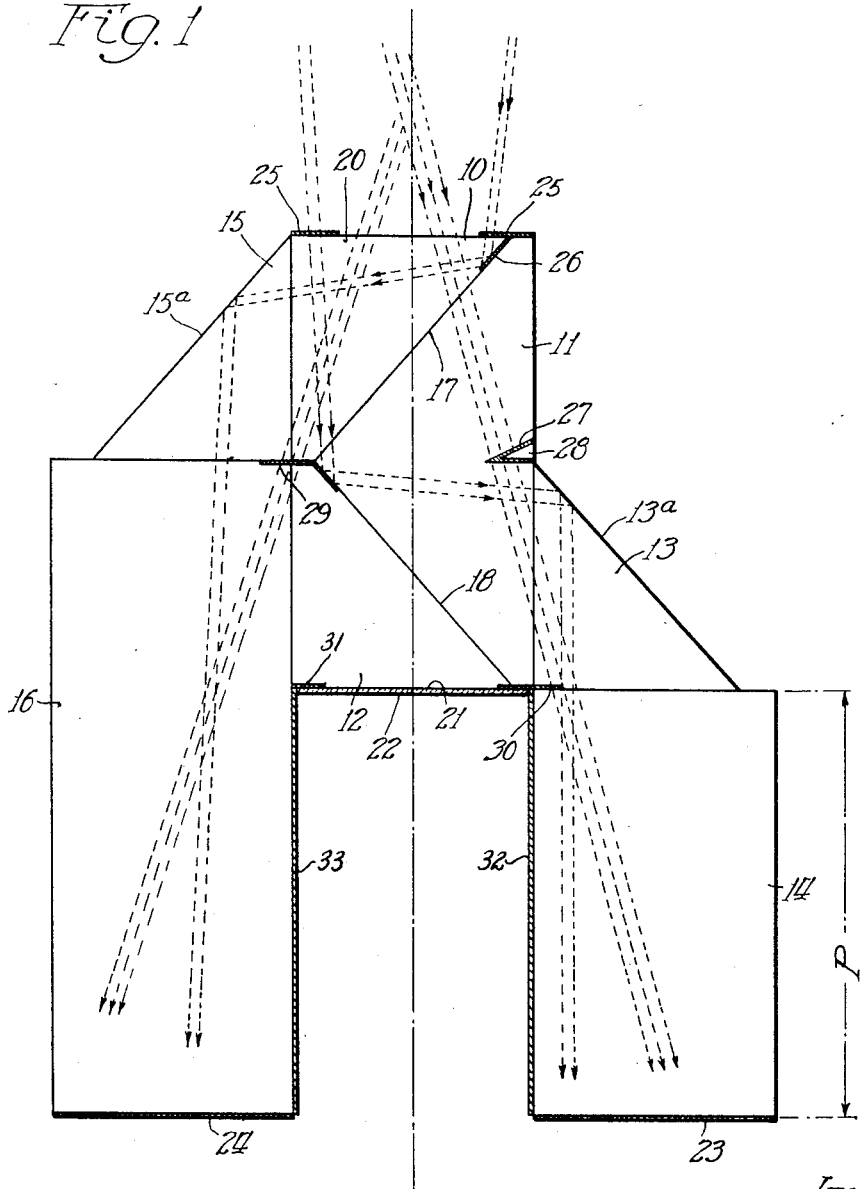
Fig. 1 is a view of a compound prism block or assembly embodying the principles of the invention illustrating typical angles of inclination of total reflecting surfaces and partial reflectors and certain fixed dimensions of the prism assembly for use with 35 m. m. films and other dimensions which are variable and depend upon the index of refraction of the material used.

Referring now more particularly to the drawings, the invention is illustrated as embodied in an assembly consisting of five prisms and two compensator blocks having their contiguous faces connected by thin layers of transparent cement such as Canada balsam, not shown. The prisms and blocks may all be constructed of crown glass, flint glass, or of any other suitable light transmitting and reflecting material or the individual prisms and blocks may be constructed, some of one material and some of another.

A prism assembly having the dimensions and constructions shown, is adapted for use with 35 m. m. films and a plurality of lens systems having different focal lengths. The intermediate prisms, respectively designated by the numerals 10, 11 and 12, provide a composite rectangular prism placed with its longitudinal axis coincident with the optic axis of a lens 19. A triangular prism 13 is cemented to the outer face of the prism 11 with one end preferably aligned with the exit face of the composite rectangular prism. A rectangular compensator block 14, preferably of the same width as the composite prism formed by the prisms 10, 11 and 12, has one end cemented to the base of the prism 13 with its inner side face in alignment with the outer side face of the prism 11. A triangular prism 15 is cemented to the outer side face of the prism 10 with one end preferably in alignment with the contiguous faces of the prisms 10 and 12. A rectangular compensator block 16, preferably of the same width as the block 14, is cemented to the prisms 12 and 15. The inclined face 15a of the prism 15 and the inclined face 13a of the prism 13 are respectively parallel to and equally spaced from the oppositely and equally inclined faces of the prism 11 in order to produce results hereinafter described. In case it is desirable to make prisms 13 and 15 of glass of different index of refraction from the glass in the rest of the assembly, suitable differences of inclination may be introduced between the correspondingly inclined faces of the prism 11 and the prisms 13 and 15 respectively if such differences are required to insure that the three image planes coincide.

The prisms 10, 11 and 12 are provided as a substitute for a single right prism in order that partial reflectors 17 and 18 may be provided between certain contiguous faces of the assembly. The partial reflectors 17 and 18 are so constructed as to separate predetermined proportions of the light and thereby cause the light to form three separate images of the photographed objective, it being understood that in the absence of the reflectors the light would all pass through the middle composite prism in the same direction as it would if the composite prism was a unitary right prism.

The partial reflector 17 comprises a metallic compound or coating of metal, such as silver. The coating is distributed uniformly over one or the other of the contiguous inclined faces of the prisms 10 and 11 by either chemical deposition, cathodic sputtering, an evaporation method, or by any other suitable method for obtaining uniformly semi-transparent surfaces. The coating is of uniform thickness and of a density such that it is partially transmitting and partially reflecting, and has the property of selective transmission and reflection of certain colors, its reflecting power being dependent upon the nature, density, and purity of the deposit and upon the color. As an alternative construction, the reflector may comprise two sections, one formed on the prism 10 and the other on the prism 11, providing the two sectional deposits are uniform in density and there is no overlapping or uncovered space. The partial reflector 18 is similarly formed on one or the other or on both of the prisms 11 and 12. Each of the partial reflectors 17 and 18 is so formed as to have uniform semi-transparency and uniform reflecting power over its entire area and is thereby adapted to selectively separate predetermined percentages of the rays contacting therewith.

Figure 2:
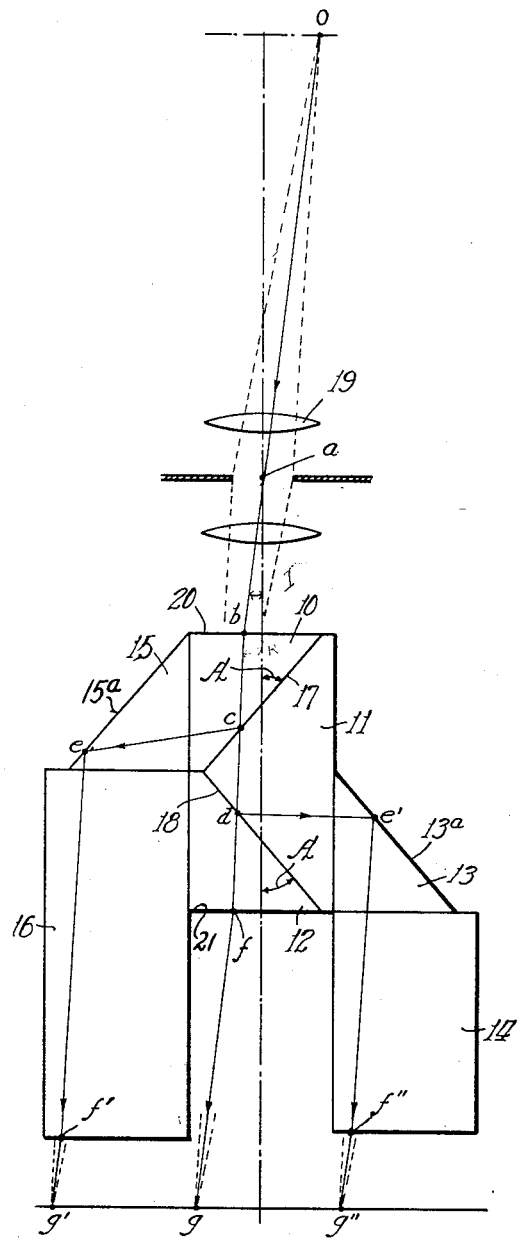
Fig. 2 is a view of the prism assembly shown in Fig. 1 as positioned adjacent to a lens, and illustrating diagrammatically the effect of the assembly upon a cone of rays passing successively through the lens and assembly from a selected point near the margin of an object being photographed.

The division of light is effected as illustrated in Fig. 2 wherein the emergent nodal point of the lens 19 is designated by $a$. The ray, indicated by a full line as passing through $a$ towards $b$, is the chief ray of a cone of rays, indicated by broken lines, which originate at any selected point $o$ in the object space and pass through the lens aperture and eventually converge to a common focal point in the image plane. Hence a description of the divided path of this typical chief ray $abc$ ... serves to illustrate the manner in which the division of the light is effected. This ray is refracted at the point $b$, lying in the front surface 20 of the prism assembly, and strikes the partial reflector 17 at point $c$.

The partial reflector 17, permits a predetermined portion of the light to be transmitted and reflects another portion to the point $e$ in the plane surface 15a. The partial reflector 17 is so constructed as to permit the transmission of a larger proportion of the light of particular colors than of others and to reflect a larger proportion of those colors which are not transmitted. That part of the light which is transmitted through $c$ passes next to point $d$ in the partial reflector 18 which, similar to partial reflector 17, has the property of partial transmission with respect to intensity and selective transmission with respect to color. The partial reflector 18 permits the transmission of light of predetermined color and quantity to the surface 21, where it is once more refracted at point $f$ so as to continue its path in air, in the same direction as its path on leaving the lens, to $g$ where all rays from the object point o converge to form an image point. The partial reflector 18 also reflects a portion of the light to the point e' in the plane surface 13a, from which it is reflected along the path e'f''.

The totally reflecting plane surfaces 15a and 13a are preferably parallel respectively to the partial reflectors 17 and 18. If this parallelism exists, after total reflection at surface 15a, the ray bce will proceed in a path approximately parallel to the path bcdf, the slight difference of parallelism being due to the difference of index of refraction possessed by the glass for different colors. Upon emergence into air at f', the ray will continue in a path f'g' parallel to the path fg, where it will meet all rays from the same object point to form an image point g'. In a manner similar to the path of ray ef'g', each ray totally reflected at plane 13a will proceed in a path e'f'' approximately parallel to its path after entering the glass at surface 20, and will proceed to the image point at g''.

It is desirable that the planes of the three images be coincident if the images are to be registered upon a photographic negative plate or on an undistorted film. Since the refraction which takes place when a ray enters the prism assembly is in obedience to the law—

$$n = \frac{\sin e\ I}{\sin e\ R}$$

where n, the index of refraction of the glass, is greater than unity; I is the angle between the ray in air and the longitudinal axis of the prism block; and R is the angle between the ray in glass and the axis, as a result of refraction, the inclination R of a ray while traveling through the prism assembly is less than its inclination I while traveling through air. Consequently, since the focal length is the distance from the emergent nodal point a of the lens 19 to the common point to which the rays converge, the less the angle of inclination the greater will be the resultant focal length. The interposition of the glass path bf into the path of the rays to the middle image will therefore cause the focal plane of the image to be farther from the lens 19 than the focal plane of the lens with only air in the path of the rays. The path of the rays to the side images, however, is changed by two reflections. On this account, if the side prisms should terminate in the same plane as the middle prism 12, the rays forming the two side images would be brought to a focus closer to the lens than the middle image. Since the inclination of a ray is less in glass than in air, thus increasing the focal distance from the lens, the compensator blocks 14 and 16 are provided which are made to project beyond the surface 21 by an amount necessary to cause the outside images to be in focus at the same plane as the middle one. In the case of very short focus lenses, it is not always possible by this device to bring the three images, suitably separated, in focus at the same plane with a prism assembly made of prisms all of the same index of refraction. In such cases, the side compensator blocks can be made of glass of higher indices of refraction than the middle prisms 10, 11 and 12, and suitable adjustments of the inclination of the total reflecting surfaces and the lengths of the compensator blocks can be made to bring all three images to the same focal plane. Thus the invention contemplates bringing the focal planes of the images into coincidence by providing suitably constructed side compensator blocks of suitable indices of refraction and projecting beyond the middle group of prisms. The slight separation of rays of different colors by dispersion, upon refraction at the interface between the different glasses can be either restricted by a choice of glasses or corrected by the insertion of a second interface elsewhere in the train of rays.

The divided rays are reflected laterally, by the partial reflectors 17 and 18, in directions determined by the principle that the angle of incidence is equal to the angle of reflection. The bounding surfaces 15a and 13a are so positioned that all of the rays separated by the partial reflectors strike the bounding surfaces at an inclination such that the beams are totally reflected in obedience to the optical principle that light traversing a medium will be totally reflected upon striking a bounding surface providing the rays all make an angle with the normal to the surface greater than the critical angle of refraction of the transmitting medium. By reason of the parallelism of the surface 15a and partial reflector 17, the rays reflected thereby leave the prism 15 and traverse the compensator block 16 in paths parallel or substantially parallel to their initial paths in the block 10. Similarly, the parallelism of the surface 13a and reflector 18 cause the rays reflected thereby to leave the prism 13 and traverse the compensator block 14, along paths parallel or substantially parallel to their initial directions in the prism 10.

The direction of the passage of a light ray through the prism assembly is determined by the law of reflection, which states that the angle of reflection at a bounding surface between two media is equal to the angle of incidence, and by the law of refraction hereinbefore referred to, which states that at the boundary between two media, the light is changed in its path in obedience to the law:

$$\frac{\sin e\ I}{\sin e\ R} = \frac{n_2}{n_1} \quad \text{(Eq. 1)}$$

where $n_1$ is the index of refraction of the medium containing the incident ray and $n_2$ the index of refraction of the medium containing the refracted ray. If the medium containing the incident ray is air, of index unity, and the medium, such as glass, containing the refracted ray if of index n, then Equation 1 becomes:

$$\sin e\ R = \frac{\sin e\ I}{n} \quad \text{(Eq. 2)}$$

By the use of these two principles of optics it is possible to calculate what the angles of the totally reflecting surfaces 13a and 15a, relative to the optic axis of the lens and longitudinal axis of the prism, should be for glass prisms of given indices of refraction in order that all of the rays so striking these surfaces will make an angle with the normal to the surface greater than the critical angle of refraction and thereby make these surfaces totally reflecting. The following method of making these calculations and the compiled results in Table I are for purposes of illustration only, it being understood that the invention contemplates the inclination of the partial reflectors and bounding surfaces at any suitable angle, hereinafter generally designated as A, which will eliminate loss of light at the reflecting surfaces 13a and 15a for all materials adapted for use in light-separating prism assemblies.

Suitable angles A may be calculated as follows:
Consider a ray ab incident on the front surface 20 of the prism assembly at an angle I of 10° 00'. For glass of index 1.515 the angle R of the refracted ray bc, calculated by Equation 2, is approximately 6° 35'. The angle of incidence of this ray upon the partial reflector 17 is given by—

$$90° - (A - R)$$

If the reflected component ce of the ray bc is to be totally reflected by the surface 15a, its angle of incidence with the surface must be greater than the critical angle of refraction. The critical angle is given by:

$$\text{sine critical angle of refraction} = \frac{1}{\text{index of refraction}} \quad \text{(Eq. 3)}$$

Hence for glass of index 1.515, the critical angle will be 41° 21' approximately, and will be given by—

$$90° - (A - R) > 41° 21' \quad \text{(Eq. 4)}$$

or, since R = 6° 35'

$$A > 42° 4' \quad \text{(Eq. 5)}$$

The angles R and A, compiled in Table I, have all been calculated in the manner illustrated for the selected indices of refraction and for the various angles of incidence I of the rays ab striking the surface 20. Obviously, the requisite value of A to obtain total reflection at the surfaces 13a and 15a can be similarly calculated for indices of refraction lying outside the range from 1.470 to 1.790 or for other indices lying within this range of values. If prisms or blocks of different indices of refraction are used in a particular assembly, it will be necessary to take into account the bending of rays as they pass from a prism or block of one index of refraction to a prism or block of different index of refraction. Since one of the purposes of the invention is to provide that all three images are in focus at a common plane, and another to provide that light is totally reflected at the bounding inclined surface, such modifications of the angles of the inclined surfaces may be made as fulfill these two purposes.

The data assembled in Table I indicates that the hitherto used angle A of 45° 00' does not permit total reflection of rays by the surfaces 13a and 15a when the angle I is greater than 3° 00' for prism material having a refractive index of 1.470 or lower. The compiled data also indicate that for indices of refraction of 1.515, 1.567 and 1.790, the maximum values of I permitting total reflection at the surfaces 13a and 15a are respectively 5° 30', 8° 00', and 20° 00'. Since the index of refraction of glass ordinarily used in reflecting prisms lies within the range of 1.515 to 1.650, it is apparent that full reflection is not obtained at the surfaces 13a and 15a with angle A at 45° 00' except for rays lying below the range from 5° 30' to 8° 00'.

The provision of partial reflectors and totally reflecting surfaces, inclined at angles A less than 45° 00', adapts the prisms for use with lens systems having focal lengths as short as 3" and maximum angles I of rays up to 12° 30' and larger for ordinary indices of refraction. In short, Table I shows that prisms having their partial reflectors and reflecting surfaces inclined at an angle of 45° are either not adapted for use with lenses of short focal lengths, or, if used therewith, a considerable portion of the light that should reach the inner portion of the side images is lost at the reflecting surfaces 13a and 15b.

There is a slight difference of magnification which is due to the spherical aberration which occurs when a convergent bundle of rays passes through the plane boundaries between air and glass. This difference of magnification is, however, negligible for the production of pictures of sufficiently equal size for reproduction and superposition in projection. For instance, if two rays are considered, one of 0° angle of incidence upon the front face 20 of the prism assembly and one of 12° angle of incidence upon the same

*Table I*

| I | Index of refraction 1.470 | | Index of refraction 1.515 | | Index of refraction 1.567 | | Index of refraction 1.790 | |
| --- | --- | --- | --- | --- | --- | --- | --- | --- |
| | R | A | R | A | R | A | R | A |
| 21°00' | | | | | | | 11°33' | 44°29' |
| 20°30' | | | | | | | 11°17' | 44°46' |
| 20°00' | | | | | | | 11° 1' | 45°01' |
| 19°30' | | | | | | | 10°45' | 45°17' |
| 19°00' | | | | | | | 10°29' | 45°33' |
| 18°30' | | | | | | | 10°13' | 45°49' |
| 18°00' | | | | | | | 9°56' | 46°06' |
| 17°30' | | | | | | | 9°39' | 46°23' |
| 17°00' | | | | | | | 9°23' | 46°39' |
| 16°30' | | | | | | | 9°06' | 46°56' |
| 16°00' | | | | | | | 8°50' | 47°12' |
| 15°30' | | | | | | | 8°34' | 47°28' |
| 15°00' | | | | | | | 8°18' | 47°44' |
| 14°30' | | | | | | | 8°02' | 48°00' |
| 14°00' | | | | | | | 7°46' | 48°16' |
| 13°30' | | | | | | | 7°30' | 48°32' |
| 13°00' | | | | | | | 7°13' | 48°49' |
| 12°30' | 8°28' | 38°40' | 8°13' | 40°29' | 7°56' | 42°25' | 6°57' | 49°05' |
| 12°00' | 8°08' | 39°00' | 7°53' | 40°49' | 7°37' | 42°44' | 6°40' | 49°22' |
| 11°30' | 7°48' | 39°20' | 7°34' | 41°08' | 7°19' | 43°02' | | |
| 11°00' | 7°27' | 39°41' | 7°14' | 41°28' | 7°00' | 43°21' | | |
| 10°30' | 7°07' | 40°01' | 6°55' | 41°47' | 6°41' | 43°40' | | |
| 10°00' | 6°47' | 40°21' | 6°35' | 42°07' | 6°22' | 43°59' | | |
| 9°30' | 6°27' | 40°41' | 6°15' | 42°27' | 6°03' | 44°18' | | |
| 9°00' | 6°06' | 41°01' | 5°56' | 42°46' | 5°44' | 44°37' | | |
| 8°30' | 5°47' | 41°22' | 5°36' | 43°06' | 5°25' | 44°56' | | |
| 8°00' | 5°26' | 41°42' | 5°16' | 43°26' | 5°06' | 45°15' | | |
| 7°30' | 5°06' | 42°02' | 4°57' | 43°45' | 4°47' | 45°34' | | |
| 7°00' | 4°45' | 42°23' | 4°37' | 44°05' | 4°28' | 45°53' | | |
| 6°30' | 4°25' | 42°43' | 4°17' | 44°25' | 4°09' | 46°12' | | |
| 6°00' | 4°05' | 43°03' | 3°57' | 44°45' | 3°50' | 46°31' | | |
| 5°30' | 3°44' | 43°24' | 3°38' | 45°04' | 3°30' | 46°51' | | |
| 5°00' | 3°24' | 43°44' | 3°18' | 45°24' | 3°11' | 47°10' | | |
| 4°30' | 3°04' | 44°04' | | | | | | |
| 4°00' | 2°43' | 44°25' | | | | | | |
| 3°30' | 2°23' | 44°45' | | | | | | |
| 3°00' | 2°02' | 45°07' | | | | | | | face, the difference of image size can be shown to be less than 0.0015 inch, and the difference of the diameters of the least circles of confusion which occupy the positions on the film or plate of the three theoretical point images of a point in the object can be shown to be less than 0.0010 inch. These differences are well within the limits acknowledged to be satisfactory for good photographic reproduction. The differences stated above are for image points at the edges of the images. At the centers of the images the differences are somewhat less.

Figure 3:
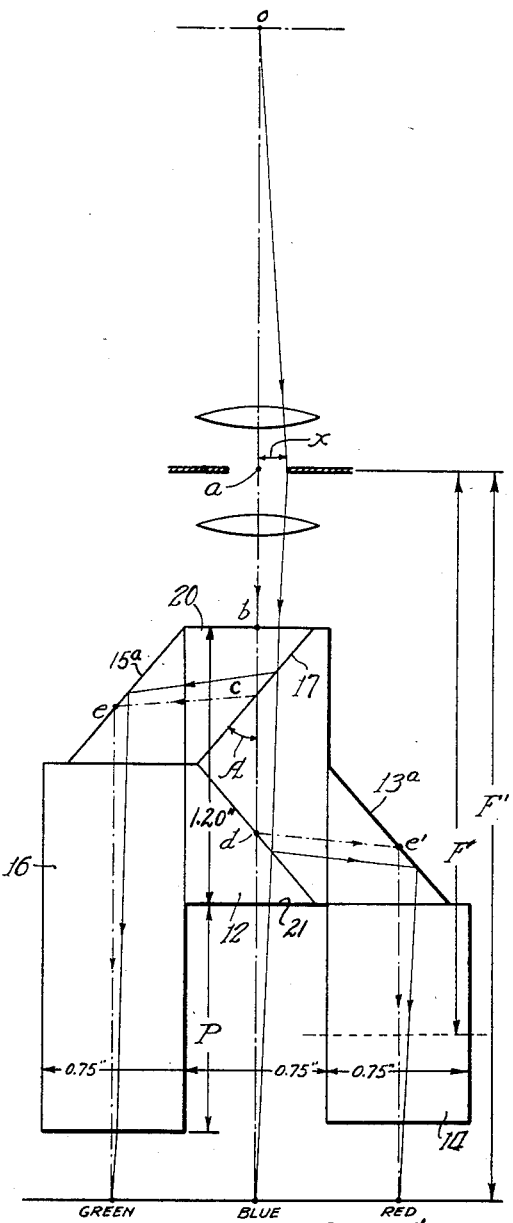
Fig. 3 is a view similar to Fig. 2 and illustrates the effect of the assembly upon a cone of rays coming from a point approximately on the center of an object being photographed and wherein the chief ray of the cone coincides with the axis of the lens and is perpendicular to the front face of the prism assembly.

Fig. 3 indicates the overall length of the middle prism as 1.20″ and the width of the side and middle prisms as 0.750″. The width of 0.750″ corresponds to the width of prisms in commercial use with 35 m. m. films wherein the picture frames extend transversely to the film and have a width of 0.748″. The overall length of 1.20″ is selected as permitting variation of the angle A of the partial reflectors 17 and 18 within the range compiled in Table I.

The amount P by which the compensator blocks 14 and 16 extend beyond the middle prism is found by reference to Fig. 3 wherein a ray is shown as passing from the object point o through the lens 19 coincident with its axis and parallel to the longitudinal axis of the prism assembly. A ray proceeding from the same object point o and refracted by the lens so that it is incident upon the face 20 of the prism assembly at an angle I, would intersect the axial ray, if the prism assembly were removed, at a point in the correct image plane for the lens alone. For convenience, consider the object to be distant, then the intersection of all rays from distant object points on the axis of the lens would be at the principal focal point of the lens. Let the distance apart of the two rays as they pass through the back nodal point of the lens be $x$, and the focal length of the lens be F, then the tangent of the angle of incidence of the ray inclined at angle I will be $x/F$, and, if the index of refraction of the glass be known, the tangent of the angle of refraction can be calculated.

As an illustration it is assumed that the glass used has the following specifications, the symbols being those used by the Jena Glass Works:

$$n_D = 1.5688$$
$$n_C = 1.56575$$
$$n_{A'} - n_C = 0.00347$$
$$n_C \quad n_e = 0.00550$$
$$n_e \quad n_F = 0.00465$$
$$n_F \quad n_g = 0.00558$$
$$n_g \quad n_w = 0.00465$$

$$\text{Dispersion} = \frac{n_D - 1}{n_F - n_C} = \frac{0.5688}{0.01015} = 56.0$$

From the above figures it follows that an average value of index for the blue is 1.582, for the green is 1.573, and for the red is 1.567, these figures being determined upon consideration of the above data, together with the range of transmission of the filters, and the characteristics of the photograph films on which the images are made.

Also let $x = 0.35$ inch and $F = 3$ inches.

These values are average values for the colors named, and the variation of index of refraction within the color ranges given is insufficient to cause any appreciable error in focal length.

Then, if the blue rays are used to produce the central picture, there results:

$$\tan I = \frac{0.35}{3} = 0.11667; \quad \sin I = 0.11588$$

$$\sin R = 0.07325; \quad \tan R = 0.07345$$

$$I = 6° 39' 16''; \quad R = 4° 12' 2''$$

If the middle block is 1.2 inches in length, then the focal length for the lens and center block combined will be:

$$F' \text{ blue} = F \times 1.2''(1 - \tan R/\tan I) = 3.4446 \text{ inches}$$

(Eq. 8)

The equation depends for its exact correctness upon the assumption that the spherical aberration, on refraction at the plane surfaces 20 and 21 of the center block, is negligible in amount.

Similarly for the green rays:

$$R = 4° 13' 30''; \quad \tan R = .07387$$
$$F' \text{ green} = 3.4403 \text{ inches}$$

and similarly for the red rays:

$$R = 4° 14' 26''; \quad \tan R = .07415$$
$$F' \text{ red} = 3.4374 \text{ inches}$$

As an illustrative example, if the reflecting surface 15a and the partial reflector 17 are inclined at an angle A of 42° to the longitudinal axis of the prism assembly, the path $ce$ of the axial light ray $bce$ will diverge from the path $bc$ at an angle of 96° 00′. Since the line $bc = 1.20''/4$ and the line $ce = 0.750''/\cos 6° 00'$, the total distance of travel $bce$ of the axial light ray from the front face 20 of the prism assembly to the reflecting surface 15a will be $1.2/4 \times 0.750''/\cos 6° = 1.0541''$. The distance of the point $e$ from the front surface 20 of the assembly, measured in a direction parallel to the longitudinal axis of the prism assembly, is $1.20''/4 + 0.750''$ (tan 6° 00′) = 0.3788″. Consequently, if green light is to be photographed on this side of the prism, since the focal length for the blue is 3.4446 inches, the total distance of travel of the axial ray from the nodal point of the lens to the focus for the green must be $3.4446 + 0.750''/\cos 6° - 0.0788 = 4.1199$ inches. But for a thickness of glass of 1.20″, the distance of travel from the lens for the green is only 3.4403 inches. Hence the focus for the green upon reflection at the parallel partial reflector 17 and the surface 15a will be $4.1199'' - 3.4403'' = 0.6796''$ farther from the film than the focus for the blue, provided the total path of the green light in glass is equal to 1.20″. The total amount of glass to be traversed is given by the equation— focus (air and glass) = focus (air only) + (glass traversed) (1 − tan R/tan I)   (Eq. 9)

Since the rays of any color, after reflection at two parallel surfaces, will proceed in a direction parallel to that held before reflection, it follows that angles I (in air) and R (in glass) are the same as before for the green. By substitution of the corresponding values in Equation 9, it becomes $4.1199 - 3.000 =$ (glass traversed) $(1 - 0.07387/0.11667)$ from which the total glass traversed is found to be 3.0523″. Since the total glass path $bce$ traversed from the front plane 20 of the assembly to the point $e$ in the surface 15a is 1.0541″, the distance traversed by the axial ray $ef'$ in the prism 15 and compensator block 16 must be $3.0523'' - 1.0541''$ or 1.9982″. Since the distance from the point $e$ to the plane surface 21, measured parallel to the longitudinal axis of the assembly is 1.20″−0.3788″ or 0.8212″, the projection P of the block 16 is 1.9982″−0.8212″=1.1770″.

Using the same angle A and indices of refraction $n$ as assumed in calculating the projection P for the block 16, the projection P for block 14 to bring its image into coincidence with the common image plane is calculated as follows:

The distance of travel $bde'$ exceeds the distance $bce$ by half the length of the middle prism or 0.60″ and hence $bde'$=1.0541+0.60=1.6541″. Also the distances of the point $e'$ from the surfaces 20 and 21, measured in a direction parallel to the longitudinal axis of the prism, are respectively 0.9788″ and 0.2212″. If red light is to be photographed on this side of the prism, the total distance of travel of the axial ray from the nodal point of the lens to the focus for the red must be 3.4374″+0.750″/cos 6° 00′−0.750″ (tan 6° 00′) or 4.1127″. For a thickness of glass of 1.20″, the distance of travel from the lens for red is 3.4374″. Hence the focus for the red upon reflection by the partial reflector 18 and the parallel surface 15a will be 4.1127″−3.4374″=0.6753″ farther from the film than the focus for the blue, provided the total path of red light is 1.20″. By substituting the corresponding values in Equation 7, it becomes 4.1127″−3.0000″=(glass traversed) (1−0.07387/0.11667) or 1.1127″=(glass traversed) 0.3667 from which the total glass traversed is found to be 3.0346″. Since the total glass path $bde'$ is 1.6541″, the distance traversed by the axial ray $e'$ $f''$ in the prism 13 and block 14 must be 3.0346″−1.6541″ or 1.3805″. Since the distance from the point $e'$ to the plane surface 21, measured parallel to the longitudinal axis of the assembly, is 0.2212″, the projection P of the block 14 is 1.3805″−0.2212″=1.1593″.

The projections P of the compensator blocks 14 and 16 can be similarly calculated for prism assemblies constructed of material of any suitable index of refraction having compensator blocks and side and middle prisms of any selected width, with bounding surfaces 13a and 15a and partial reflectors 17 and 18 inclined at any angle A permitting total reflection.

The exit faces of the middle prism and of the compensator blocks 14 and 16 are respectively provided with a blue filter 22, a red filter 23 and a green filter 24. Inasmuch as the red filter requires a shorter exposure period than does the blue or green if subjected to light of the same intensity, and since the filters are necessarily all exposed for the same length of time, proper exposure is secured by correspondingly varying the intensity of the light transmitted to the respective filters. The partial reflectors 17 and 18 are not only adapted to provide light of the requisite intensity but also, taking advantage of the property of selective transmission possessed by semi-transparent metallic coatings, to provide that in the light transmitted to the blue filter 22 there is a preponderance of blue, that in the light transmitted to the red filter 23, there is a preponderance of red, and in the light transmitted to the green filter 24, there is a preponderance of green, for example, a partial reflector consisting of a semi-transparent coating transmits more of blue than of red and green. Since the light reflected by the partial reflector 22 is preponderately red and green, ordinarily it would be a matter of indifference whether the light reflected by the partial reflector 17 was thereafter passed through a red filter or through a green filter. However, it is found in practice that a suitable green filter is more difficult to obtain than a suitable red filter and, therefore, it is preferable to place the green filter in the path of the light reflected by the partial reflector 17. The reflecting power of the partial reflector 17 is made sufficiently high and is so related to the reflecting power of the partial reflector 18 as to insure the quality of photographic density of the three images. In short, the silver coatings of the partial reflectors are so arranged as to provide proper relative intensities of the light at each filter and to direct to each filter light which contains a preponderance of the particular color transmissible to that filter.

In practice it is found that false images are produced and that the true images are more or less blurred as a result of side or random rays passing through the prism assembly.

Fig. 1 approximately illustrates the unobstructed paths of the major portion of the interfering rays and the position of the masks provided to obstruct the same, both by preventing the entrance into the prism of a considerable portion of the rays and the blocking of the remainder before they completely traverse the prism.

The masks are constructed of suitable light absorbing material such, for example, as optical black and are so positioned as not to intercept any of the rays which converge to form the three images within their respective frames. A pair of masks 25, positioned on the inlet face 20 of the prism 10, prevent the major portion of such interfering rays from entering the prism. The irregular rays are obstructed, some by a mask 26 positioned between the prisms 10 and 11, some by an exterior mask 27 positioned in a groove 28 formed in the prism 11, some by a mask 29 positioned between the contiguous edges of the prisms 10, 11, 12, 15, and block 16, and still others by a mask 30 positioned between the prism 13 and block 14 and extending along the aligned edges of the prisms 11 and 12. A mask 31 is positioned on the edge of the exit face of the prism 12 opposite the mask 30. Masks 32 and 33 respectively form covers for the adjacent faces of the blocks 14 and 16.

It is also found in practice that a system of masks positioned as described, effectively obstruct the troublesome rays and prevent the formation of false images or the blurring of the true images.

Thus it will be seen that we have provided an improved assembly of light dividing prisms and compensator blocks for producing three images of different colors of the same photographic object, which consists in providing a pair of oppositely inclined partial reflectors adapted to divide the image bearing rays into three sets of rays, each having a preponderance of a given range of color and relative quantum such as to produce a correct exposure and photo-chemical effect or density on the photographic film or plate, whereby the images upon recombination in projection in superimposed relation upon a screen show photographed objects in their true colors, there being provided a pair of bounding reflecting surfaces respectively parallel to the partial reflectors and positioned in the path of and inclined to the reflected light so that all of the reflected light is again reflected to produce equally spaced side images of correct distribution of intensity, the side images being brought into a common plane with the middle image by providing compensator blocks extending beyond the middle prism by distances predetermined in accordance with the respective refractive qualities of the prism and block material and the color range of the respective images, the inclination of the total reflecting surfaces being predetermined in accordance with the optical law that total reflection occurs only when the rays are all incident at angles greater than the critical angle of refraction of the prism material of which the surfaces are boundaries.

Having thus described our invention, it is obvious that various immaterial modifications may be made in the same without departing from the spirit of our invention; hence we do not wish to be understood as limiting ourselves to the exact form, construction, arrangement and combination of parts herein shown and described or uses mentioned.

What we claim as new and desire to secure by Letters Patent is:

1. A prism assembly, including compensator blocks, for producing three images side by side and substantially edge to edge in a common focal plane, free from the reduction of photographic density otherwise due to lack of total reflection, the assembly being interposed in the path of converging rays from a lens system, and being constructed with a front receiving face normal to the axis of the system, a first partially reflecting diagonal surface enclosed by glass, an exterior diagonal total reflecting surface parallel to the same, a second partially reflecting diagonal surface enclosed by glass and having an inclination equal and opposite to that of the first partially reflecting surface, an exterior diagonal total reflecting glass surface parallel to the second partially reflecting surface, said exterior faces each being positioned in the path of the light reflected by the partially reflecting surface to which it is parallel, a rear transmitting face in the path of the unreflected components of rays, and rear transmitting faces in the paths of the reflected components of rays, the three rear faces being parallel to the front face and located at such distances from it as to bring the three images in a common focal plane, said diagonal faces being inclined at angles substantially less than 45° by at least two minutes to the optical axis to bring all rays in each convergentt cone of light from any point in a field of view whose image is obtained, after entering said light receiving face, to strike said exterior diagonal surfaces at angles of incidence greater than the critical angle of incidence for the glass used.

2. A prism assembly, including compensator blocks, for producing three images side by side and substantially edge to edge in a common focal plane, free from the reduction of photographic density otherwise due to lack of total reflection, the assembly being interposed in the path of converging rays from a lens system, and being constructed with a front receiving face normal to the axis of the system, a first partially reflecting diagonal surface enclosed by glass, an exterior diagonal total reflecting surface parallel to the same, a second partially reflecting diagonal surface enclosed by glass and having an inclination equal and opposite to that of the first partially reflecting surface, an exterior diagonal total reflecting glass surface parallel to the second partially reflecting surface, said exterior faces each being positioned in the path of the light reflected by the partially reflecting surface to which it is parallel, a rear transmitting face in the path of the unreflected components of rays, and rear transmitting faces in the paths of the reflected components of rays, the three rear faces being parallel to the front face and located at such distances from it as to bring the three images in a common focal plane, the diagonal faces being inclined to the optical axis at angles as small as 38° and no larger than 44°30' for rays having angles of incidence on the light receiving faces of 15° or less.

3. A prism assembly, including compensator blocks, for producing three images side by side and substantially edge to edge in a common focal plane, free from the reduction of photographic density otherwise due to lack of total reflection, the assembly being interposed in the path of converging rays from a lens system, and being constructed with a front receiving face normal to the axis of the system, a first partially reflecting diagonal surface enclosed by glass, an exterior diagonal total reflecting surface parallel to the same, a second partially reflecting diagonal surface enclosed by glass and having an inclination equal and opposite to that of the first partially reflecting surface, an exterior diagonal total reflecting glass surface parallel to the second partially reflecting surface, said exterior faces each being positioned in the path of the light reflected by the partially reflecting surface to which it is parallel, a rear transmitting face in the path of the unreflected components of rays, and rear transmitting faces in the paths of the reflected components of rays, the three rear faces being parallel to the front face and located at such distances from it as to bring the three images in a common focal plane, the index of refraction of the prism material being less than 1.65 for all rays having angles of incidence on the light receiving face of 15° or less, and the diagonal faces being inclined at angles as small as 38° and no larger than 44°30' to the axis of the system.

4. A prism assembly, including compensator blocks, for producing three images side by side and substantially edge to edge in a common focal plane, free from reduction of photographic density otherwise due to lack of total reflection, the assembly being interposed in the path of converging rays from a lens system, the assembly being constructed with a front receiving face normal to the axis of the system, a first partially reflecting diagonal surface enclosed by glass, an exterior diagonal total reflecting glass surface parallel to the same, a second partially reflecting diagonal surface enclosed by glass and having an inclination equal and opposite to that of the first partially reflecting surface, an exterior diagonal total reflecting glass surface parallel to the second partially reflecting surface, said exterior faces each being positioned in the path of the light reflected by the partially reflecting surface to which it is parallel, a rear transmitting face in the path of the unreflected components of rays, and rear transmitting faces in the paths of the reflected components of rays, the three rear faces being parallel to the front face and located at such distance from it as to bring the three images in a common focal plane, said diagonal faces being inclined at angles substantially less than 45° by at least two minutes to the optical axis to bring all rays in each convergent cone of light from any point in a field of view whose image is obtained, after entering said light receiving face, to strike said exterior diagonal faces at angles of incidence greater than the critical angle of incidence for the glass used, the maximum angle of inclination of the convergent rays being greater than 5° for glass whose index of refraction is as small as 1.5.

5. A prism assembly, including compensator blocks, for producing three images side by side and substantially edge to edge in a common focal plane, free from reduction of photographic density otherwise due to lack of total reflection, the assembly being interposed in the path of converging rays from a lens system, the assembly being constructed with a front receiving face normal to the axis of the system, a first partially reflecting diagonal surface enclosed by glass, an exterior diagonal total reflecting glass surface parallel to the same, a second partially reflecting diagonal surface enclosed by glass and having an inclination equal and opposite to that of the first partially reflecting surface, an exterior diagonal total reflecting glass surface parallel to the second partially reflecting surface, said exterior faces each being positioned in the path of the light reflected by the partially reflecting surface to which it is parallel, a rear transmitting face in the path of the unreflected components of rays, and rear transmitting faces in the paths of the reflected components of rays, the three rear faces being parallel to the front face and located at such distance from it as to bring the three images in a common focal plane, said diagonal faces being inclined at angles substantially less than 45° by at least two minutes to the optical axis to bring all rays in each convergent cone of light from any point in a field of view whose image is obtained, after entering said light receiving face, to strike said exterior diagonal faces at angles of incidence greater than the critical angle of incidence for the glass used, the maximum angle of inclination of the convergent rays being greater than 5° for glass whose index of refraction is as small as 1.5 and greater than 12° for glass whose index is 1.65.

6. A prism assembly for producing three images side by side and substantially edge to edge in a common focal plane when the assembly is interposed in the path of converging rays from a lens system, the assembly being constructed with a front receiving face normal to the axis of the system, a first partially reflecting diagonal internal surface, an exterior diagonal totally reflecting glass surface parallel to the same, a second partially reflecting diagonal internal surface and having an inclination equal and opposite to that of the first partially reflecting surface, an exterior diagonal totally reflecting glass surface parallel to the second partially reflecting surface, said exterior faces each being positioned in the path of the light reflected by the partially reflecting surface to which it is parallel, a rear transmitting face in the path of the unreflected components of rays, and rear transmitting faces in the paths of the deflected components of rays, the three rear faces being parallel to the front face and located at such distance from it as to bring the three images in a common focal plane, said diagonal faces being selectively inclined at angles substantially less than 45° by at least two minutes to the optical axis of the assembly to bring all reflected components of rays in each convergent cone of light from any point in a field of view whose image is obtained, after entering said light receiving face, to strike said exterior diagonal faces at angles of incidence greater than the critical angle of incidence for the glass used, whereby all component rays striking the exterior reflectors are totally reflected to produce images free at the inner sides thereof from the reduction of photographic density otherwise due to lack of total reflection.

7. A prism assembly combination for producing three images by separating each ray of light which has passed through a lens into three components, said assembly comprising a rectangular middle composite prism having one end providing a light-receiving face, said composite prism comprising three contiguous blocks, the inner faces of the end blocks being equally and oppositely inclined to said light-receiving face and the intermediate block having correspondingly inclined faces contiguous to said inclined faces of the end blocks, partial reflectors comprising layers of material positioned between the respective contiguous inclined faces, said layers of material each reflecting a portion of the light laterally but oppositely to the sides of the composite prism and permitting a portion to pass longitudinally through said prism, two right triangular prisms positioned on opposite sides of said rectangular prism with their diagonal faces respectively parallel to said partial reflectors and positioned in the path of the light reflected thereby, the angle of inclination of said reflectors and diagonal faces to the optical axis of the assembly being selectively less than 45° by an amount greater than customary permissible optical tolerances for a 45° prism, such that the reflected components of all rays entering said light-receiving face strike said exterior diagonal faces at angles of incidence greater than the critical angle of incidence of the prism material, a green filter positioned in the path of the components of the rays reflected by the partial reflector with which the undivided rays first contact, a red filter positioned in the path of the components of rays reflected by the other of said partial reflectors, and a blue filter positioned in the path of the unreflected components of said rays, said middle composite prism having opaque masks at each end and on opposite sides intermediate the ends.

CLETUS L. DIXON.
KENNETH W. KENNEDY.
JOSEPH P. STANDO.